US008707215B2

(12) United States Patent
Hamadene et al.

(10) Patent No.: US 8,707,215 B2
(45) Date of Patent: Apr. 22, 2014

(54) HAND-HELD DEVICE AND METHOD FOR OPERATING A SINGLE POINTER TOUCH SENSITIVE USER INTERFACE

(75) Inventors: Hafid Hamadene, Forest Park, IL (US); Roger J. Jellicoe, Woodstock, IL (US); Donald W. Zerrien, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 1023 days.

(21) Appl. No.: 12/343,259

(22) Filed: Dec. 23, 2008

(65) Prior Publication Data
US 2009/0327978 A1   Dec. 31, 2009

Related U.S. Application Data

(60) Provisional application No. 61/018,383, filed on Dec. 31, 2007.

(51) Int. Cl.
*G06F 3/033* (2013.01)
*G06F 3/041* (2006.01)

(52) U.S. Cl.
USPC .......................................... 715/863; 345/173

(58) Field of Classification Search
USPC .................. 715/753, 863; 345/173
See application file for complete search history.

(56) References Cited

U.S. PATENT DOCUMENTS 5,543,588 A   8/1996 Bisset et al.
5,729,219 A   3/1998 Armstrong et al.
5,896,575 A   4/1999 Higginbotham et al.
5,959,260 A   9/1999 Hoghooghi et al.
6,335,725 B1  1/2002 Koh et al.
(Continued)

FOREIGN PATENT DOCUMENTS

JP   2001184160 A   7/2001
JP    200549978 A   2/2005
(Continued)

OTHER PUBLICATIONS

Counterpart PCT Search Report, PCT Application No. PCT/US2008/088362; Oct. 8, 2009; 12 pages.

(Continued)

*Primary Examiner* — Tadeese Hailu
*Assistant Examiner* — Darrin Hope

(57) ABSTRACT

A hand-held device and method for operating a single pointer touch sensitive user interface of a hand-held electronic device are provided. The method includes defining as being active a first one of a set of two or more controllable interface functions including at least a first controllable interface function and a second controllable interface function. A control gesture is then detected and the control gesture is associated with the active one of the set of two or more controllable interface functions, where the detected pattern adjusts the performance of the active controllable interface function. A transition gesture is then detected including a pointer pattern movement, which is not included as a control gesture for any of the two or more controllable interface functions, where upon detection of the transition gesture, the transition gesture defines a second one of the set of two or more controllable interface functions as being the active one of the set of two or more controllable interface functions. A further control gesture is then detected and the control gesture is associated with the active one of the set of two or more controllable interface functions, where the detected pattern adjusts the performance of the active controllable interface function.

20 Claims, 4 Drawing Sheets

| 302 — CONTROLLABLE INTERFACE FUNCTION | ORDERED LIST ⎯304 GESTURE DEFINITION | CONTROLLABLE EFFECT — 306 |
|---|---|---|
| FUNCTION 1 | GESTURE 1 | EFFECT |
| FUNCTION 2 | GESTURE 1 | EFFECT |
|  | GESTURE 2 | EFFECT |
| FUNCTION 3 | GESTURE 1 | EFFECT |
| FUNCTION 4 | GESTURE 1 | EFFECT |
|  | GESTURE 3 | EFFECT |

(56) References Cited

U.S. PATENT DOCUMENTS

| | | | |
|---|---|---|---|
| 6,346,935 | B1 | 2/2002 | Nakajima et al. |
| 6,647,145 | B1 | 11/2003 | Gay |
| 6,927,747 | B2 | 8/2005 | Amirzadeh et al. |
| 7,075,513 | B2 | 7/2006 | Silfverberg et al. |
| 7,205,959 | B2 | 4/2007 | Henriksson |
| 2003/0184528 | A1* | 10/2003 | Kawasaki et al. ............. 345/173 |
| 2006/0092355 | A1 | 5/2006 | Yang et al. |
| 2006/0197750 | A1 | 9/2006 | Kerr et al. |
| 2006/0197753 | A1 | 9/2006 | Hotelling |
| 2006/0284853 | A1 | 12/2006 | Shapiro |
| 2007/0075915 | A1 | 4/2007 | Cheon et al. |
| 2007/0103454 | A1 | 5/2007 | Elias |
| 2007/0177803 | A1 | 8/2007 | Elias et al. |
| 2008/0062141 | A1* | 3/2008 | Chandhri ..................... 345/173 |
| 2009/0325643 | A1 | 12/2009 | Hamadene et al. |

FOREIGN PATENT DOCUMENTS

| | | |
|---|---|---|
| JP | 2006221268 A | 8/2006 |
| RU | 2201618 C2 | 3/2003 |
| RU | 2236036 C2 | 9/2004 |
| WO | 0208881 A2 | 1/2002 |
| WO | 2008030563 A2 | 3/2008 |

OTHER PUBLICATIONS

PCT Search Report, PCT Application No. PCT/US2008/088372; Jul. 31, 2009; 11 pages.

Federal Service on Intellectual Property "Decision on Grant—A Patent for Invention" for Russian Patent Application No. 2412-169362 dated Aug. 19, 2013, 6 pages.

United States Patent and Trademark Office, "Notice of Allowance and Fee(s) Due" for U.S.Appl. No. 12/343,264 dated May 11, 2012, 8 pages.

* cited by examiner

HAND-HELD DEVICE AND METHOD FOR OPERATING A SINGLE POINTER TOUCH SENSITIVE USER INTERFACE

FIELD OF THE INVENTION

The present invention relates generally to a device and a method for supplying a user input to a hand-held device, and more particularly, to a single pointer touch sensitive user interface incorporating a transition gesture for switching between multiple controllable interface functions.

BACKGROUND OF THE INVENTION

Devices are increasingly incorporating multiple types of functionality, each having varying types of controls. Touch sensitive input panels are similarly being more widely implemented to support a user's interaction with many types of hand-held devices relative to at least some of the multiple types of incorporated functionality. In order to maximize screen size, while limiting the overall dimension of the device, many of these devices incorporate the touch sensitive panels in conjunction with a display, where the user interaction with the touch panel is supported with visual prompts and feedback, and/or the user is interacting with elements being displayed on the screen. However many implementations of touch sensitive panels, used in conjunction with a display involve a user interacting with the touch sensitive panels, which can obstruct at least partially the user's view of the screen, and the elements on the screen with which the user is attempting to interact. Furthermore, interaction with the display with ones fingers can often leave smudges, which while they do not generally affect the operation of the device, can sometimes affect the appearance of the device, and may also impact the perceived image quality.

Some devices have attempted to relocate the touch sensitive input panel on the back side of the device, in order to avoid some of the downside associated with interacting with the device using the same surface shared with the display. However, in some implementations it is not always clear which elements on the screen that the user might be engaging. Some embodiments, have attempted to compensate, by superimposing a visual representation of the current position of pointing device such as a finger as it slides across the touch sensitive input panel located on the rear of the device. However, this generally requires that the finger remain in relative proximity to the back of the device, while being tracked and that might limit the available interactions for other activities.

Furthermore, many types of touch sensitive input panel implementations are limited to providing a single location value associated with interacting with the input panel regardless as to whether a single position or multiple positions on the input panel are being engaged. In some instances, when multiple positions are simultaneously engaged, an averaging of the actual positions may be reported to an input controller, which in some circumstances may be misleading and/or misinterpreted by the device. As a result, it may be difficult to track the position of multiple pointing objects, such as a user's multiple fingers, and/or it may affect the accuracy of the reported position.

Consequently, the present inventors have recognized that it would be beneficial if an effective control scheme could be implemented that makes use of a single pointer for interacting with a touch sensitive user interface, which would readily allow the user to interact with the device via multiple controllable interface functions that can be readily accessed.

SUMMARY OF THE INVENTION

The present invention provides a method for operating a single pointer touch sensitive user interface of a hand-held electronic device. The method includes defining as being active a first one of a set of two or more controllable interface functions including at least a first controllable interface function and a second controllable interface function. A control gesture is then detected and the control gesture is associated with the active one of the set of two or more controllable interface functions, where the detected pattern adjusts the performance of the active controllable interface function. A transition gesture is then detected including a pointer pattern movement, which is not included as a control gesture for any of the two or more controllable interface functions, where upon detection of the transition gesture, the transition gesture defines a second one of the set of two or more controllable interface functions as being the active one of the set of two or more controllable interface functions. A further control gesture is then detected and the control gesture is associated with the active one of the set of two or more controllable interface functions, where the detected pattern adjusts the performance of the active controllable interface function.

In at least one embodiment, each of the control gesture and the transition gesture is a single pointer pattern movement.

In at least a further embodiment, the hand-held electronic device includes a display on an exterior surface of the device.

In a still further embodiment, the common exterior interface surface is an exterior device surface on the opposite side of the exterior surface of the device that includes the display.

The present invention further provides a hand-held device. The hand-held device includes a single pointer touch sensitive user interface, and a user input controller, which is coupled to the single pointer touch sensitive user interface. The user input controller includes an active function identifier module, a movement to function control mapping module, and a pattern matching module for detecting a transition gesture. The hand-held device further includes a storage module for maintaining a set of two or more controllable interface functions.

DETAILED DESCRIPTION OF THE PREFERRED EMBODIMENT(S)

Figure 1:
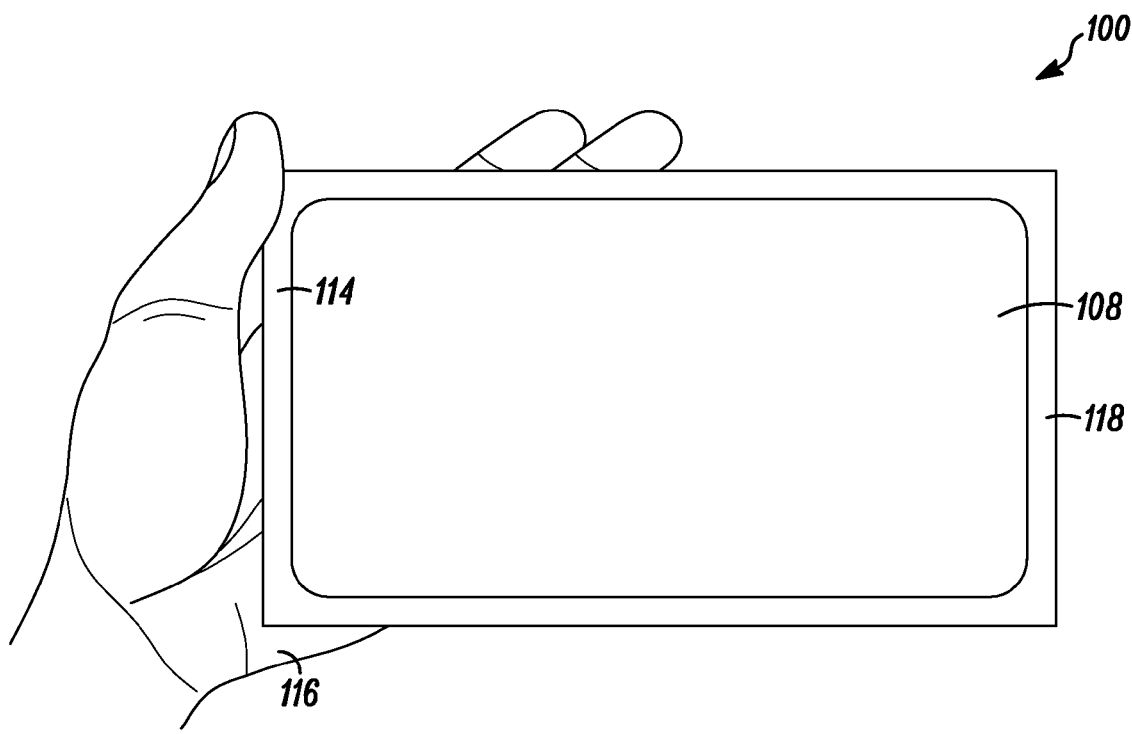
FIG. 1 is a front plan view of an exemplary hand-held device having a touch sensitive user interface on a surface of the device which is opposite the surface containing a device display.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 2:
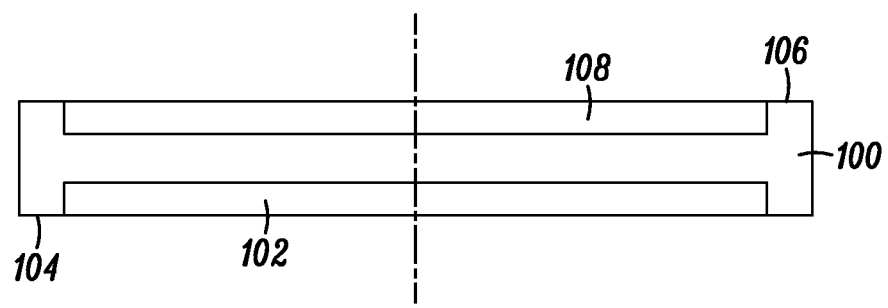
FIG. 2 is a side plan view of an exemplary hand-held device, illustrated in FIG. 1.

FIGS. 1 and 2 illustrate a front and side plan view of an exemplary hand-held device 100 having a touch sensitive user interface 102 on a surface 104 of the device, which is opposite the surface 106 of the device including a display 108. The touch sensitive user interface 102 includes a touch sensitive array, which has position sensors that are adapted for detecting a relative position of a corresponding pointer device relative to the touch sensitive user interface 102.

A pointer device can include a user's finger or a stylist, or any other suitable generally elongated element for identifying a particular area associated with the touch sensitive array. In FIG. 1, the device 100 is illustrated as being held by a hand 116 on at least one of the (i.e. the left) sides 114. The hand 116 typically belongs to the user of the device. In addition to being held on the left side 114, often times, the user will hold the right side 118 of the device with the other hand (i.e. right hand—not shown).

Figure 3:
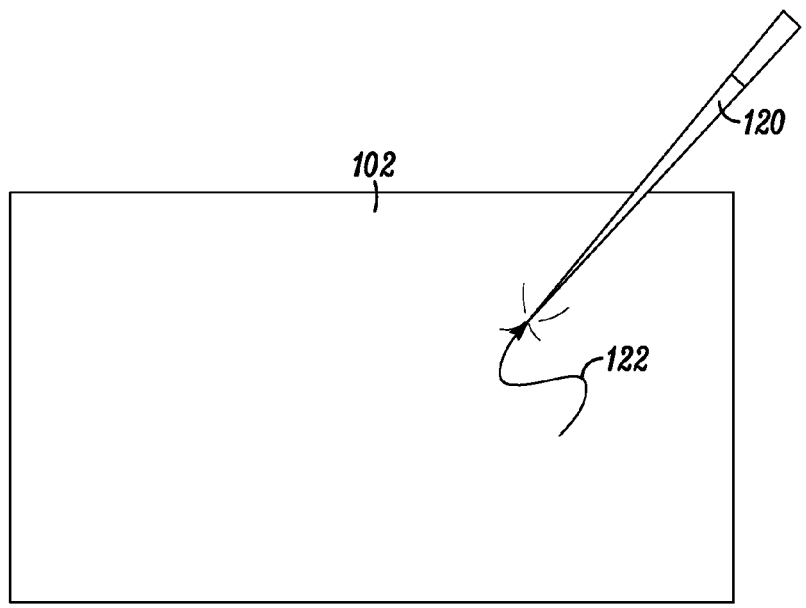
FIG. 3 is a view of a pointer device engaging a touch sensitive surface and tracing a potential exemplary single pointer pattern movement that might be effective as a gesture for adjusting the performance of an active controllable interface function.

Through the use of a finger or a stylist 120, a user can produce a gesture that can be detected by the device 100 through an interaction with the touch sensitive interface 102. FIG. 3 illustrates an example of a pointer device 120 engaging a touch sensitive surface 102 and tracing a potential exemplary single pointer pattern movement 122 that might be effective as a gesture for adjusting the performance of an active controllable interface function. In accordance with the present invention, there are two types of gestures, a control gesture and a transition gesture. Control gestures are used to adjust the performance of the active controllable interface function. A controllable interface function, which is active, represents a controllable interface function that is currently configured to be adjusted by a received control gesture. Alternatively, a transition gesture will cause to be selected a new controllable interface function that is active. Generally a transition gesture will include a pointer pattern movement, which is not included and/or does not correspond to a gesture being used as a control gesture.

In accordance with at least some embodiments, when a transition gesture is received, the active gesture will be switched to a controllable interface function that is contained in an ordered list, where the active designation is generally moved to the next controllable interface function in the list. In some instances, there may be multiple transition gestures that may allow more freedom in assigning the active designation to a particular controllable interface, which can be found in the ordered list. For example, one particular transition gesture might step forward through the list of controllable interface functions in the order in which they are contained in the list. Another particular transition gesture might step backward through the list of controllable interface functions in the order in which they are contained in the list, when assigning the active designation. Still further, a particular transition gesture might enable the active designation to be assigned based upon a number of steps through the ordered list, where the particular number of steps is made part of the gesture.

Once a new controllable interface function is identified as being active, all subsequent control gestures are used to adjust the performance of the new active controllable interface function until a still further controllable interface function is identified as being active. Generally, no more than a single controllable interface function will be active at any time. Generally, a user can add or subtract controllable interface functions from the ordered list, which in turn simplifies toggling between controllable interface functions. For example, for an item on a display like a map, it may be beneficial to limit the controllable interface functions contained in the ordered list to pan and zoom. Such that when one toggles between multiple controllable interface functions, thereby assigning a new corresponding active designation, one does not need to cycle through a controllable interface function that is unrelated to the task being presently performed by the user on the device.

By allowing multiple types of control gestures to be toggled through, and correspondingly adjusted, a user can navigate through the various applications of interest with a single pointer or finger.

In some instances a particular controllable interface function may be responsive to more than one type of gesture that might produce a related but different effect. For example, a gesture including the repeated writing of a line having a length might adjust the zoom of an image being displayed an amount corresponding to the length of the detected line. By lifting the pointer and repeating the line gesture one might be able to produce a still further zoom effect in the same direction. Alternatively, tapping one's finger in place once on the touch sensitive user interface might represent a still further gesture related to zooming that might change the direction of zooming from zooming in to zooming out, where further line gestures continues to provide the zooming function, but now in the opposite direction.

To the extent that it may be desirable to intersperse a panning function, one can activate the controllable interface function associated with panning, by inputting a transition gesture, assuming that panning is the next controllable interface function in the ordered list. At least one example of a transition function includes a double tap in place. A control gesture for panning might include tracing a line in the direction that you want the center of the image being displayed to be moved.

Figure 4:
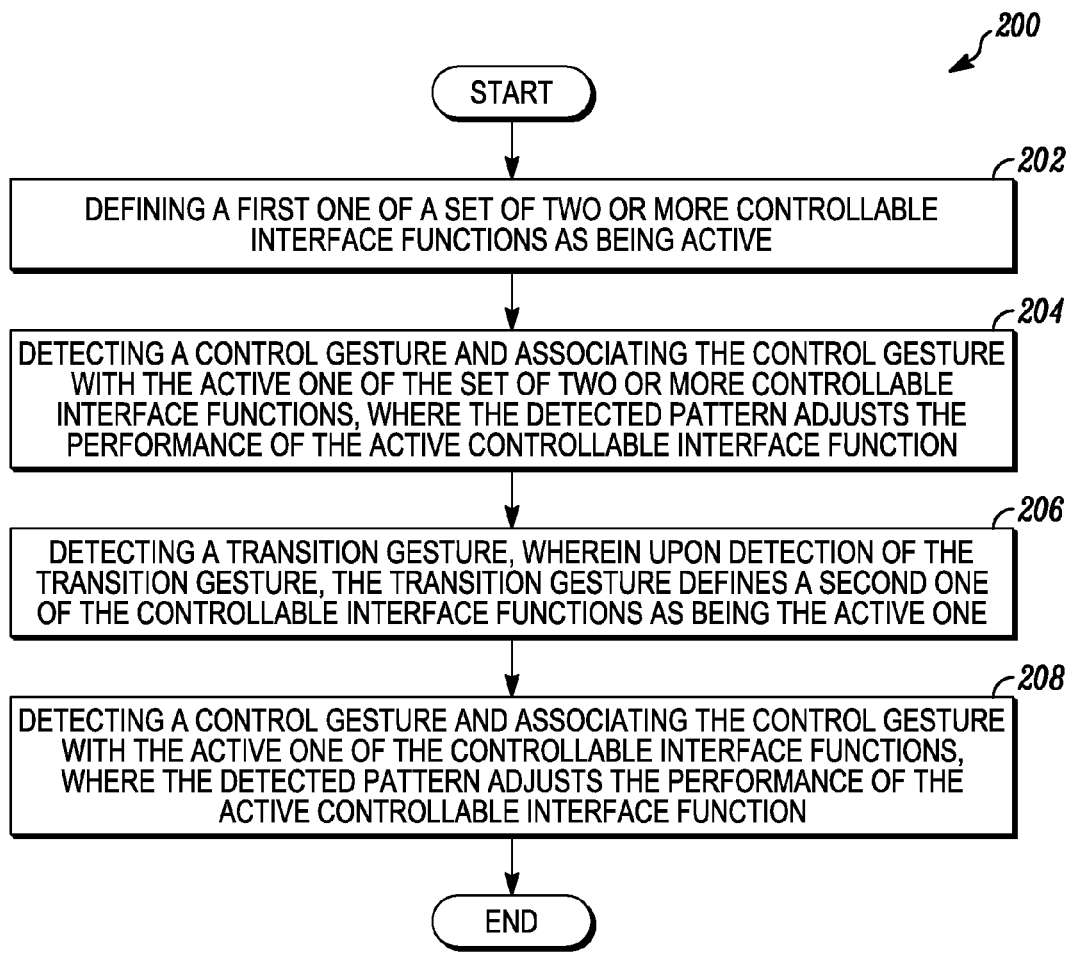
FIG. 4 is a flow diagram of a method for operating a single pointer touch sensitive user interface of a hand-held device in accordance with at least one embodiment of the present invention.

FIG. 4 illustrates a flow diagram of a method 200 for operating a single pointer touch sensitive user interface of a hand-held device in accordance with at least one embodiment of the present invention. The method includes defining 202 a first one of a set of two or more controllable interface functions as being active. A control gesture is then detected 204. Upon detecting a control gesture, the detected control gesture is associated with the active one of the set of two or more controllable interface functions, where the detected pattern adjusts the performance of the active controllable interface function. A transition gesture is then detected 206, where upon detection of the transition gesture, the transition gesture defines a second one of the controllable interface functions as being the active one. A further control gesture is then detected 208. The detected control gesture is then associated with the newly assigned active one of the controllable interface functions, where the detected pattern serves to adjust the performance of the active controllable interface function. In this way a sequence of detectable gestures in the form of a sequence of single pointer pattern movements can be used to control one or more interface functions.

Figure 5:
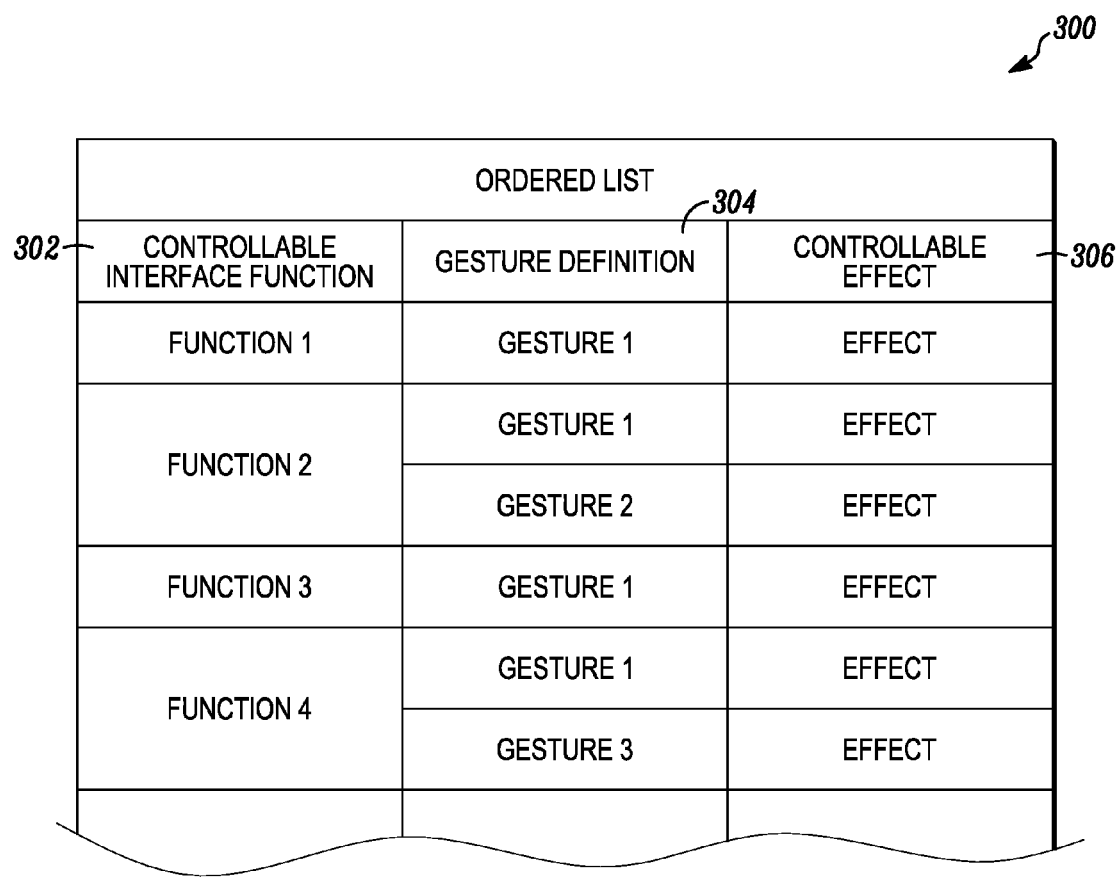
FIG. 5 is a block diagram of an ordered list of different types of controllable interface functions, in accordance with at least one embodiment of the present invention.

FIG. 5 illustrates a block diagram of an ordered list 300 of different types of controllable interface functions 302, in accordance with at least one embodiment of the present invention. While in some instances the ordered list 300 may be limited to a set of controllable interface functions 302 that are currently being cycled through, in other instances, the ordered list may additionally include additional information including definitions 304 of the detectable gestures associated with each of the functions, as well as the corresponding controllable effect 306. In some instances, the gesture definitions 304 and controllable effects 306 may be stored in a different location and/or table.

As noted previously, a particular function 302 may have more than one associated detectable control gesture 304, which in turn may produce a different effect 306 related to the function 302. Furthermore, the same gesture may be used with multiple different functions, and correspondingly have a different related effect.

Figure 6:
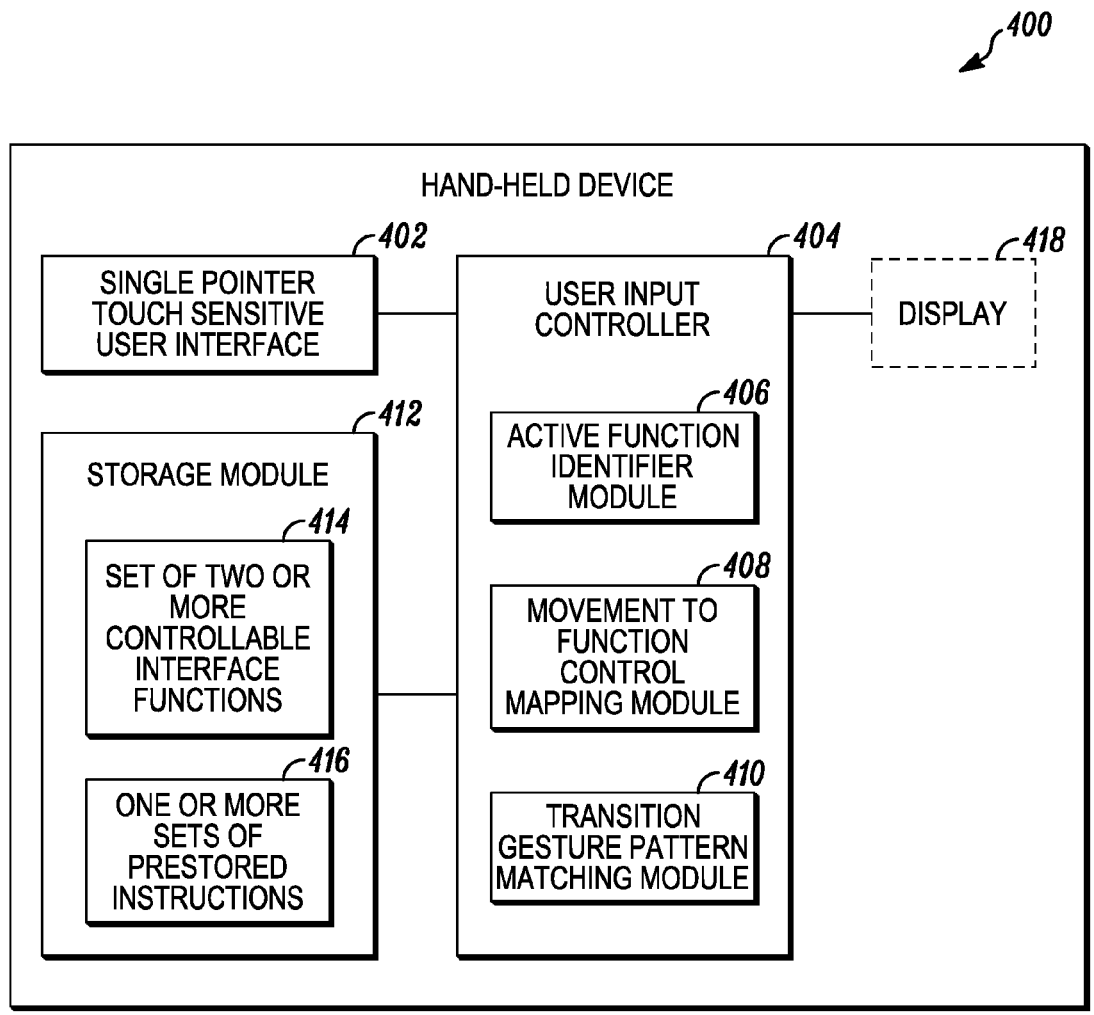
FIG. 6 is a block diagram of a hand-held device for managing a single pointer pattern movement for adjusting the performance of the active controllable interface function, in accordance with at least one embodiment of the present invention.

FIG. 6 illustrates a block diagram of a hand-held device 400 for managing a single pointer pattern movement for adjusting the performance of the active controllable interface function, in accordance with at least one embodiment of the present invention. The hand-held device 400 includes a single pointer touch sensitive user interface 402. Generally, the touch sensitive user interface can employ various types of touch or proximity sensing technologies including capacitive arrays as well as resistive arrays, the touch sensitive arrays can even employ force sensing resistor arrays, for detecting the amount of force being applied at the selected location. In this way, a force threshold determination can be taken into account in determining the intended interaction including the making of a control gesture and/or a transition gesture. One skilled in the art will readily appreciate that other types of touch and/or proximity sensitive technology may be employed without departing from the teachings of the present invention.

The exemplary hand-held device further includes a user input controller 404, which has an active function identifier module 406 adapted for keeping track of the particular controllable interface function that is currently active. The user input controller 404 further includes a movement to function control mapping module 408, which is adapted for detecting a control gesture to the set of permissible gestures associated with the active controllable interface function. The user input controller 404 still further includes a transition gesture pattern matching module 410. The hand-held device 400 still further includes a storage module 412, which can be used to store the set of two or more controllable interface function 414, which in some embodiments takes the form of a data structure in the form of an ordered list. The storage module can further include one or more sets of prestored instructions 416.

In at least some embodiments, the user input controller 404 can be implemented at least in part using one or more microprocessors, which might operate in conjunction with the one or more sets of prestored instructions to perform some of the functionality associated with the controller. The one or more sets of prestored instructions can be stored in the corresponding microprocessor, or can be stored as previously noted in the storage module 412, which might include one or more types of memory devices coupled to the microprocessor. Examples of various types of memories include forms of volatile and/or non-volatile memory, such as conventional ROM, EPROM, RAM, or EEPROM, as well as other forms of storage including fixed or removable discs. In some instances some or all of any memory for storing prestored instructions can be maintained separate from the device 400, for example on a server which might be communicatively coupled to the device 400.

While at least some of the functionality associated with the controller can be managed under the direction of one or more sets of prestored instructions, one skilled in the art will readily recognize that the controller can include additional and/or alternative forms, such as sequential state machines and operational logic circuitry, which could be implemented in hardware, software and/or both. To the extent that any portion of the functionality is implemented using hardware elements, the same could be constructed using discrete logic elements, gate array or programmable logic array type structures, and/or could be implemented in a VLSI type structure, without departing from the teachings of the present invention.

In some instances, the hand-held device might further include a display 418, while many of the previous examples have involved affecting controllable interface functions associated with a display 418, in some instances it may be possible to use single pointer gestures to control other elements separate from the display, for example, such as the volume of a speaker.

One skilled in the art will recognize that the hand-held device can take many different forms, without departing from the teachings of the present invention. For example, the hand-held device can take the form of a wireless communication device, such as a cellular radio telephone, a paging device and a cordless telephone. Furthermore without intending to be an exhaustive list, the hand-held device can take the form of a personal digital assistant, a portable computer, pen-based or keyboard-based handheld devices, a remote control unit, an audio player (such as an MP3 player), a digital camera, or a video game player.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for operating a single pointer touch sensitive user interface of a hand-held electronic device, said method comprising:
   defining a first one of a set of two or more controllable interface functions including at least a first controllable interface function and a second controllable interface function as being active;
   detecting a control gesture including a pointer pattern movement and associating the control gesture with the active one of the set of two or more controllable interface functions, where the detected pointer pattern movement adjusts the performance of the active controllable interface function;
   detecting a transition gesture including a pointer pattern movement, which is not included as a control gesture for any of the two or more controllable interface functions, wherein upon detection of the transition gesture, the transition gesture defines a next one corresponding to a second one of the set of two or more controllable interface functions as being the active one of the set of two or more controllable interface functions;
   detecting a control gesture including a pointer pattern movement and associating the control gesture with the active one of the set of two or more controllable interface functions, where the detected pointer pattern movement adjusts the performance of the active controllable interface function; and detecting the transition gesture including the pointer pattern movement, and defining a next one of the set of two or more controllable interface functions as being the active one of the two or more controllable interface function, wherein when the second one of the set of two or more controllable interface functions was the active one of the two or more controllable interface functions when the transition gesture was detected, the next one of the set of two or more controllable interface functions defined as being active is no longer the second one of the set of two or more controllable interface functions.

2. A method in accordance with claim 1, wherein the set of two or more controllable interface functions is arranged as an ordered list of different types of controllable interface functions, where only one of the set of two or more controllable interface functions is active at any time;

wherein upon detection of a transition gesture, the active one of the set of two or more controllable interface functions is set to the next controllable interface function in the ordered list, based upon the order in which the controllable interface function appears in the ordered list.

3. A method in accordance with claim 2, wherein the transition gesture includes an indicator of the direction to move through the ordered list of controllable interface functions.

4. A method in accordance with claim 2, wherein the transition gesture includes an indicator of the number of steps to move through the ordered list of controllable interface functions.

5. A method in accordance with claim 2, wherein the user can add and subtract controllable interface functions from the set of two or more controllable interface functions, as well as control the order in which controllable interface functions appear in the ordered list.

6. A method in accordance with claim 1, wherein each of the control gesture and the transition gesture is a single pointer pattern movement.

7. A method in accordance with claim 1, wherein the single pointer touch sensitive user interface is located on a common exterior interface surface.

8. A method in accordance with claim 7, wherein the hand-held electronic device includes a display on an exterior surface of the device.

9. A method in accordance with claim 8, wherein the set of two or more controllable interface functions includes a display pan function, and a display zoom function.

10. A method in accordance with claim 8, wherein the common exterior interface surface is an exterior device surface on the opposite side of the exterior surface of the device that includes the display.

11. A method in accordance with claim 10, wherein the current relative position of an end of a pointer interacting with the single pointer touch sensitive user interface is illustrated on the display.

12. A method in accordance with claim 1, wherein the control gesture and the transition gesture are made by a user's finger interacting with the single pointer touch sensitive user interface.

13. A method in accordance with claim 1, wherein the control gesture and the transition gesture are made by a stylist interacting with the single pointer touch sensitive user interface.

14. A method in accordance with claim 1, wherein the single pointer touch sensitive user interface includes a position sensor and a force sensor, wherein each of the control gesture and the transition gesture are decoded based upon sensed position values and force values during the detection of the gesture.

15. A hand-held device comprising:
a single pointer touch sensitive user interface; and
a user input controller, coupled to the single pointer touch sensitive user interface, the user input controller including
an active function identifier module,
a movement to function control mapping module, and
a pattern matching module for detecting a transition gesture; and
a storage module for maintaining a set of two or more controllable interface functions;
wherein the active function identifier module upon detection of a transition gesture by the pattern matching module defines a next one in the set of two or more controllable interface functions as being active; and
wherein the hand-held device is adapted to define a first one of the set of two or more controllable interface functions including at least a first controllable interface function and a second controllable interface function as being active; detect a control gesture including a pointer pattern movement and associate the control gesture with the active one of the set of two or more controllable interface functions, where the detected pointer pattern movement adjusts the performance of the active controllable interface function; detect the transition gesture including a pointer pattern movement, which is not included as a control gesture for any of the two or more controllable interface functions, wherein upon detection of the transition gesture, the transition gesture defines the next one corresponding to a second one of the set of two or more controllable interface functions as being the active one of the set of two or more controllable interface functions; detect a control gesture including a pointer pattern movement and associating the control gesture with the active one of the set of two or more controllable interface functions, where the detected pointer pattern movement adjusts the performance of the active controllable interface function; and detect the transition gesture including the pointer pattern movement, and define the next one of the set of two or more controllable interface functions as being the active one of the two or more controllable interface function, wherein when the second one of the set of two or more controllable interface functions was the active one of the two or more controllable interface functions when the transition gesture was detected, the next one of the set of two or more controllable interface functions defined as being active is no longer the second one of the set of two or more controllable interface functions.

16. A hand-held device in accordance with claim 15, the single pointer touch sensitive user interface is associated with a common exterior surface of the hand-held device.

17. A hand-held device in accordance with claim 16 further comprising a display.

18. A hand-held device in accordance with claim 17 wherein the display is located on an exterior surface of the hand-held device opposite to the common exterior surface of the single pointer touch sensitive user interface.

19. A hand-held device in accordance with claim 15, wherein the storage module includes one or more sets of prestored instructions associated with one or more of the active function module, the movement to function control mapping module, and the pattern matching module for execution by the user input controller.

20. A hand-held device in accordance with claim 15, wherein the hand-held device is a radio frequency telephone.

\* \* \* \* \*